May 28, 1957 J. W. COLLINS ET AL 2,793,971
METHOD OF MAKING REINFORCED PLASTIC STRUCTURE
Filed Feb. 1, 1954 2 Sheets-Sheet 1
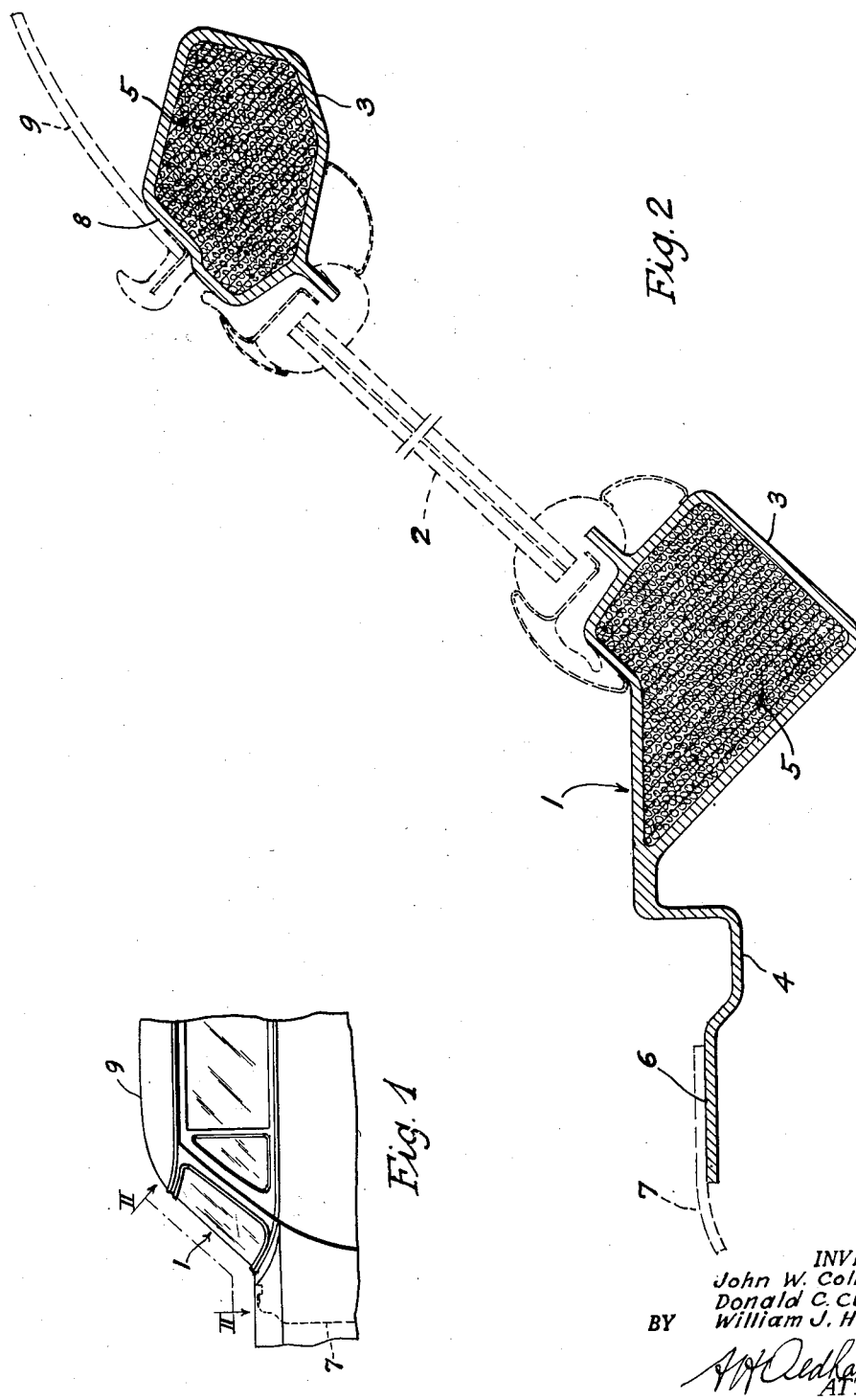
INVENTORS
John W. Collins
Donald C. Cully &
BY William J. Hampshire
ATTORNEY

United States Patent Office 2,793,971
Patented May 28, 1957

2,793,971

METHOD OF MAKING REINFORCED PLASTIC STRUCTURE

John W. Collins, Donald C. Cully, and William J. Hampshire, Cuyahoga Falls, Ohio, assignors to Goodyear Aircraft Corporation, a corporation of Delaware Application February 1, 1954, Serial No. 407,412

1 Claim. (Cl. 154—110)

This invention relates in general to the construction of vehicle bodies made of fibre glass-reinforced thermosetting plastics and in particular to the construction of automobile bodies constituted of convenient components molded of such material.

Hitherto it has been known to use glass fibre reinforced thermosetting plastics for the construction of automobile bodies. However, the construction in these cases was based essentially on that used for sheet metal bodies. That is, the supporting and stiffening members such as hollow columns, door and window frames, and the like where made of channels, angles and similar structural parts, each being separately molded and then joined together by bonding or riveting into a composite structure. Such method is very complicated, requires much labor and tooling, is heavy and high in cost. It has also been known to insert plastic foam cores in hollow stiffening members having constant cross-section, however, such cores were sawed out of cured flat plates and shaped to proper dimensions, but which could be bent only along slight curvatures so that their application was limited to shapes involving little or no multicurvature.

It is the general object of the invention to avoid and overcome the foregoing and other difficulties of and objections to prior art practices by the provision of uniting the wall and hollow stiffening portions of the single body components into a monolithic structure, that is, to mold each body section or component in substantially one piece and, then, connecting the various body components by bonding into a complete body.

Another object of the invention is to improve the strength of the hollow body stiffening members by cores of foamed plastic material and to simplify by their use the molding process of the body components.

Another object of the invention is to reduce the weight, labor, and cost of the automobile body, as well as, the tooling costs by reducing the number of molds required.

The aforesaid objects of the invention, and other objects which will become apparent as the description proceeds are achieved by providing for each body section or component a pair of molds, male and female, preferably made of steel, upon one of which are placed the necessary number of glass fibre reinforced plies of thermosetting plastic material. For casting the plastic foam cores, a two-part core mold, preferably also made of plies of glass fibre reinforced thermosetting plastic material, is formed over the steel molds and into which is poured plastic foam material, for instance, a mixture of diisocyanate and alkyd resin in desired proportion to foam and to be either semi-cured at room temperature, or in most cases fully cured at elevated temperature. This core, then, is placed upon the plies laid up in the steel mold and enveloped in ply material. After closing the steel mold, pressure and curing heat is applied to the ply material with the result of obtaining a product forming a monolithic structure with the foam core bonded thereto. Using a preformed fully cured core has the advantage that the ply material can be easily and quickly formed around the core to the proper shape, so that by such method assembling of many structural elements by a complicated riveting or bonding process can be dispensed with, including the further advantages of obtaining greater strength, lighter weight and smoother appearance. In some cases where the formed core does not need to have the exact shape it may be only semi-cured so that, when enclosed in the ply material it will expand at elevated temperature during the curing process of the article in the mold and force the ply material against the mold surfaces.

For a better understanding of the invention reference should be had to the accompanying drawings, wherein Fig. 1 is a fragmentary side view of the upper front portion of an automobile body.

Fig. 2 is a fragmentary cross-sectional view taken on line II—II of Fig. 1, showing one embodiment of the invention of uniting hollow structural portions of a body component with a sheet portion thereof.

Figure 3:
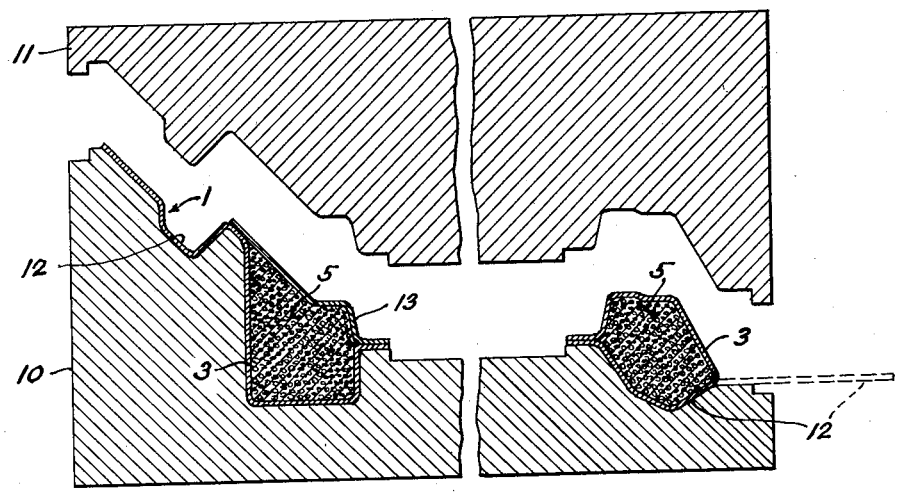
Fig. 3 is a fragmentary cross-sectional view of a pair of matched metal molding dies showing an example of the method of molding an automobile body component of the cross-sectional configuration shown in Fig. 2.
Figure 4:
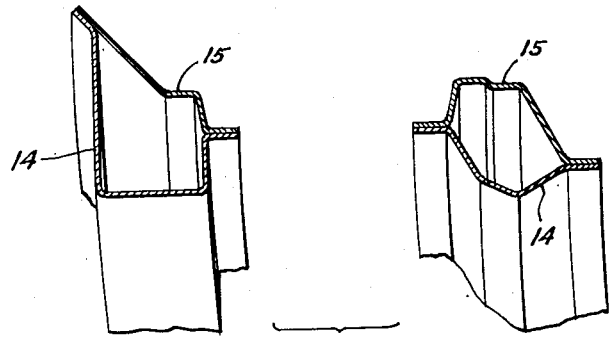
Fig. 4 is a fragmentary cross-sectional view of a pair of core molds made of glass fibre reinforced plies of thermosetting plastics molded over the metal die.
Figure 5:
Fig. 5 is a front view of the foamed plastic core contained in the body component.
Figure 7:
Fig. 7 is a side view thereof.
Figure 6:
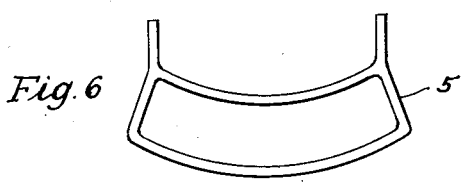
Fig. 6 is a top view of Fig. 5.

With specific reference to the form of the invention illustrated in the drawings the numeral 1 indicates in general the automobile body component containing the wind shield 2 surrounded by the hollow frame 3 which, combined with the sheet portion 4, forms a monolithic structure. A foamed plastic core 5 fills out as a stiffener the interior of the hollow frame 3 and is bonded thereto. Each one of the components which constitute the whole automobile body forms substantially a monolithic structure of greater or lesser curvatures. These components are connected with each other by bonding as, for instance at 6 the dashboard 7 and at 8 the roof 9 to the component 1.

As illustrated in Fig. 3, the body component 1, containing the hollow frame 3, is molded, preferably, in a metal mold which consists of two matching parts 10 and 11, by laying up in one mold part, in this case in part 10, a plurality of glass fibre reinforced thermosetting plastic layers 12 required to make up the desired wall thickness. For molding the hollow frame portions 3 of component 1 the pre-foamed and cured core 5 made, as hereinafter described of plastic foam is placed on top of the shaped layers 12 which have previously been draped into the mold to the position shown in Fig. 3. The placing of the cores 5 in position as described helps press the layers 12 into position in the mold. The core 5 shown at the left side of Fig. 3 is then covered with glass fibre reinforced thermosetting plastic layers 13, whereas, as shown on the right side, where there is extending no sheet portion from the hollow frame, the end portion of the layers 12, indicated in dotted lines, is folded over core 5. The mold parts 10 and 11 are then closed and pressure and heat are applied for curing the body component. Such procedure makes it possible to easily mold the hollow frame portion 3 to exact shape and also to reinforce it by the core 5. There is normally enough semi-liquid plastic in the layers 12 and 13 so that when engaged with the preformed core 5 and cured the plastic will flow into the surface pores of the core and be firmly adhered thereto. Of course, additional plastic cement may be employed.

For casting the plastic core 5, a set of core molds consisting of two parts 14 and 15 is readily and inexpensively molded against the metal molds 10 and 11, respectively, from glass fibre reinforced thermosetting plastic material. This is easily accomplished by inverting mold 11 and laying the plastic material 15 against it, pressing the material by hand against the mold over the full surface thereof. In the same manner the plastic material 14 is pressed against the mold 10. The materials 14 and 15, as is well known in the art, are then cured at atmospheric or elevated temperature, depending upon their exact composition. It will be understood that the molds 14 and 15 are greased, covered with pliofilm or otherwise treated so that when foaming material to form the cores is poured thereon and cured, usually with moderate heat which will not disturb the plastic molds 14 and 15, the cured core can be removed from the molds without sticking. Thus, the core molds will assure that the dimensions of core 5 will correspond exactly to the inner dimensions of the frame portion 3 of body component 1.

From the foregoing description it will be understood that the objects of the invention have been achieved of obtaining for an automobile body components made of plies of glass fibre reinforced thermosetting plastic material a simplified monolithic construction which is lighter in weight, greater in strength, requires less labor at correspondingly lower cost. It should be noted, however, that the construction, according to the invention described and illustrated specifically for an automobile body, is not restricted thereto but serves only as an example of the invention which can be used for any object to be made of glass fibre reinforced thermosetting plastics in which panels or sections are reinforced by hollow stiffeners.

While certain representative embodiments and details have been shown for the purpose of illustrating the invention it will be apparent to those skilled in this art that various changes and modifications may be made therein without departing from the spirit or scope of the invention.

What we claim:

That method of making a monolithic structure of layers of fibre glass reinforced thermosetting plastic material having portions strengthened with foamed plastic cores surrounded by layers of said material which includes the steps of providing complementary male and female molds for forming the structure, placing layers of reinforced plastic material in each of said male and female molds in the region for the placement of the foamed plastic cores in the final molding operation, curing said layers and removing them from the molds, placing foamable plastic in said cured layers and foaming and curing said plastic to form cores, removing the cores from the layers, placing layers of fibre glass reinforced thermosetting plastic material on at least one of said molds over substantially the area thereof constituting the structure to be formed and to a thickness about equal to the aforesaid cured layers, placing the cores in proper position on the fibre glass layers, covering the cores with fibre glass layers to a thickness about equal to the aforesaid cured layers, engaging the complementary molds, curing the structure in the complementary molds, and removing the structure from the molds.

References Cited in the file of this patent

UNITED STATES PATENTS

| | | |
|---|---|---|
| 2,381,631 | Waring | Aug. 7, 1945 |
| 2,482,798 | Rheinfrank et al. | Sept. 27, 1949 |
| 2,484,141 | Alex | Oct. 11, 1949 |
| 2,560,599 | Ryan | July 17, 1951 |
| 2,589,786 | Engel et al. | Mar. 18, 1952 |
| 2,614,059 | Cooper | Oct. 14, 1952 |
| 2,630,868 | Ellenberger | Mar. 10, 1953 |
| 2,642,920 | Simon et al. | June 23, 1953 |
| 2,722,962 | Hampshire et al. | Nov. 8, 1955 |
| 2,724,868 | Kish | Nov. 20, 1955 |

OTHER REFERENCES

Army Sleds for the Arctic, Holmes, Modern Plastics, April 1952, vol. 29, No. 8, pages 115–118, page 117 particularly relied upon.